(12) United States Patent
Sinclair

(10) Patent No.: US 6,603,312 B2
(45) Date of Patent: Aug. 5, 2003

(54) MULTI-FREQUENCY ARRAY INDUCTION TOOL

(75) Inventor: Paul L. Sinclair, Austin, TX (US)

(73) Assignee: CBG Corporation, Austin, TX (US)

( * ) Notice: Subject to any disclaimer, the term of this patent is extended or adjusted under 35 U.S.C. 154(b) by 0 days.

(21) Appl. No.: 09/735,232

(22) Filed: Dec. 11, 2000

(65) Prior Publication Data

US 2003/0004647 A1 Jan. 2, 2003

(51) Int. Cl.$^7$ ............................................. G01V 3/30
(52) U.S. Cl. ................................. 324/339; 324/335
(58) Field of Search ............................... 324/338, 339, 324/340, 341, 335

(56) References Cited

U.S. PATENT DOCUMENTS

| 4,451,787 A | * | 5/1984 | Meador ........................ 324/338 |
| 5,495,174 A | | 2/1996 | Rao et al. |
| 6,216,089 B1 | | 4/2001 | Minerbo ........................ 702/7 |

FOREIGN PATENT DOCUMENTS

GB          1134536          11/1968

* cited by examiner

*Primary Examiner*—Walter E. Snow
(74) *Attorney, Agent, or Firm*—Clive Menezes & Associates, P.C.; Clive D. Menezes

(57) ABSTRACT

An apparatus and method is disclosed for induction logging of electrical properties of earth formations that operates at low frequencies while remaining resistant to skin effect and maintaining mutual balancing. The apparatus includes a plurality of transmitter coils that are at a plurality of distances from a measure point located at an end of the apparatus, and a receiver coil array coupled to receive induced voltages resulting from currents induced in the earth formations by one or more transmitters of the plurality of transmitter coils, wherein the common measure point is located within the receiver coil array, and wherein one or more of the plurality of distances from the measure point are determined according to a function of one or more frequencies associated with one or more transmitters of the plurality of transmitters. According to an embodiment, the function includes determining the distance that is inversely proportional to a square root of the frequency associated with the one or transmitter. In another embodiment, the distances include $\sqrt{2}*N$, $\sqrt{2}/2*N$, $\sqrt{2}/4*N$, $2N$, $N$, $N/2$ and $N/4$, wherein N is a fixed distance such as one meter. An embodiment of the method includes subtracting signals received from a borehole compensation array disposed at the end of the tool from signals received at the receiver coil array, the subtracting reducing the influence of local changes in borehole diameter.

39 Claims, 9 Drawing Sheets

MULTI-FREQUENCY ARRAY INDUCTION TOOL

BACKGROUND OF THE INVENTION

1. Field of the Invention

The present invention relates to the field of logging and inspecting of oil, gas and mineral wells. More particularly, the invention relates to a multi-frequency array induction tool.

2. Description of the Related Art

Induction logging tools are instruments used in logging operation in boreholes that are drilled into underground rock formations in the search for oil, gas, or minerals. Induction logging tools measure the electrical conductivity of rock formations to determine the presence and the amount of desired minerals in a particular pay-zone. Oil and natural gas cause the rock to have a lower than usual conductivity because these fluids are electrically non-conducting and they displace connate fluids such as conductive saline water. Induction logging tools ideally provide accurate quantitative measures of the fractional saturation of oil or gas in the pay zone.

Induction logging tools employ arrays of sensors that map the rock conductivity at various radical distances from the borehole so that the perturbing influence of invasion of borehole fluids may be reduced.

The tools operate on the principle of induced eddy-currents, also known as Foucault currents, that are substantially proportional to conductivity and which may be excited and detected using sensitive coils. Tools that are known in the art use arrays of coils that provide capabilities of sensing conductivity to one or more different radial depths.

Despite advances in induction logging tools, several problems with the tools remain to be solved. For example, induction tools typically report errors due to the influence of adjacent rock-beds of contrasting conductivity. Further, boreholes may hold conductive fluids that influence readings of an induction logging tool. The influence of the conductive fluids increases when the borehole diameter varies due to caving or when the cross-section is not circular due to various drilling problems. Moreover, borehole fluids containing slightly magnetic materials introduce more subtle problems.

Highly conductive formations present further problems for induction logging tools due to "skin effect." Skin effect causes a loss of proportionality between a received signal and formation conductivity, thereby making interpretation of signals from induction logging tools more complex. Skin effect prevents operators from neglecting attenuation of propagated signals in formations that are highly conductive. Typically, induction logging tools allow for a moderate skin effect at higher conductivity and correct for the skin effect. However, responses in highly conductive formations are often non-linear. Corrections for non-linear responses are difficult to make. Conversely, very low conductivity rocks present accuracy problems for logging tools due to low signal to noise ratios.

Logging tools that traverse sequences of thin rock-beds or boundaries with high relative dip angles present spurious responses that are difficult to correct. Further, logging tools do not accurately log boreholes that are invaded by borehole fluids that have conductivity very different from the connate fluids in the rock, or that create complex annulus profiles in the invaded zone.

Several attempts have been made to try to resolve these problems, each of which provided complex and expensive tools, and each of which exhibits some shortcoming in their ability to accurately measure and profile the rock conductivity over a wide range of radial distances in conditions that are commonly encountered in oil explorations. All of these designs employ "depth-shifting" of the recorded data, to align the effective measurement points of the individual measurements, with resulting errors when the tool motion is erratic.

SUMMARY OF THE INVENTION

In accordance with the present invention, an apparatus and method is disclosed for induction logging of electrical properties of earth formations that operates at low frequencies while remaining resistant to skin effect and effect and maintaining mutual balancing. The apparatus includes a plurality of transmitter coils that are at a plurality of distances from a measure point located at an end of the apparatus, and a receiver coil array coupled to receive induced voltages resulting from currents induced in the earth formations by one or more transmitters of the plurality of transmitter coils, wherein the measure point is located within the receiver coil array, wherein one or more of the plurality of distances from the measure point are determined according to a function of one or more frequencies associated with one or more transmitters of the plurality of transmitters.

The method includes providing a tool operable in a borehole, the tool including a plurality of transmitter coils that are at a plurality of distances from a measure point located within a receiver coil array at an end of the tool. The method further includes receiving at the receiver coil array induced voltages resulting from currents induced in the earth formations by one or more transmitters of the plurality of transmitter coils and using the energy from the plurality of transmitter coils to determine the electrical properties of earth formations. The method further includes choosing one or more of the plurality of distances from the measure point according to a function of one or more frequencies associated with one or more transmitters of the plurality of transmitters.

According to an embodiment, the function includes determining the distance that is inversely proportional to a square root of the frequency associated with the one or more transmitters. The distances include $\sqrt{2}*N$, $\sqrt{2}/2*N$, $\sqrt{2}/4*N$, 2N, N, N/2 and N/4, wherein N is a fixed distance such as one meter. The method further includes subtracting signals received from a borehole compensation array disposed at the end of the tool from signals received at the receiver coil array, the subtracting reducing the influence of local changes in borehole diameter. According to an embodiment, the borehole compensation array includes a main borehole compensation receiver coil, a borehole compensation bucking receiver coil coupled to the main borehole compensation receiver coil, and a borehole compensation transmitter coil configured to be operable with the main borehole compensation receiver coil and the borehole compensation bucking receiver coil.

An embodiment of the method includes receiving residual skin-effect error voltages at the receiver coil array that are substantially the same for each transmitter of the plurality of transmitters. Further, an embodiment provides that the plurality of transmitter coils have the same axial spatial relationship. An apparatus and method provides that at least one transmitter of the plurality of transmitters contains a magnetic core material to enhance the magnetic moment of the at least one transmitter, the magnetic moment of the transmitter being increased independent of mutual balancing of the transmitter-receiver combination of the at least one transmitter and the receiver coil array. The enhancing of the magnetic moment of the at least one of the transmitters of the plurality of transmitters permits operations at frequencies of 8 kHz and lower. Further the receiver coil array, according to one embodiment, is coupled to one or more receiver circuits located near the receiver coil array, the location assisting in maintaining the mutual balancing of the transmitter-receiver combination.

An embodiment of the apparatus and method includes a transmitting circuit energizing the plurality of transmitter coils via a master crystal-controlled oscillator coupled to a binary divider string to provide a plurality of frequency signals, and a receiving circuit coupled to the transmitting circuit. The transmitting circuit includes a plurality of band-pass filters coupled to receive the plurality of frequency signals; and a plurality of power amplifiers coupled to the plurality of transmitter coils, the plurality of transmitter coils further being coupled to a plurality of capacitors, each transmitter coil having an associated capacitor for tuning the transmitter coil. The transmitting circuit further includes a plurality of phase-sensitive detectors providing reference inputs of the receiving circuit. The receiving circuit includes a mutual balancing system for balancing received signals associated with each transmitter coil of the plurality of transmitter coils. The mutual balancing system further includes a receiving coil, a bucking coil, and one or more band-pass filters coupled to the receiving coil at one or more tap locations, the tapping at different turns counts of the receiver coil to provide mutual balancing for associated transmitter coils.

In an embodiment, the receiving circuit includes one or more phase-sensitive detectors synchronized with one or more transmitters to demodulate voltages received by the receiver coil, the balancing system and the phase-sensitive detectors enabling simultaneous measurements of the earth formations independent of mutual interference.

In another embodiment, the apparatus and method provides that the tool includes a control circuit coupled to the transmitting circuit and the receiving circuit, the transmitting circuit further including one more multi-pole switches configured to sequentially couple the plurality of transmitter coils to a plurality of frequency signals, the one or more multi-pole switches coupling the plurality of frequency signals to one or more band-pass filters. Further, the control circuit coordinates which of the frequency signals is chosen by the one or more multi-pole switches and chooses one or more of a plurality of tapped signals. In one embodiment, the control circuit is implemented as a software program in a micro-controller circuit, the software program generating control signals for the one or more multi-pole switches.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

The use of the same reference symbols in different drawings indicates identical items unless otherwise indicated.

DETAILED DESCRIPTION

Figure 1:
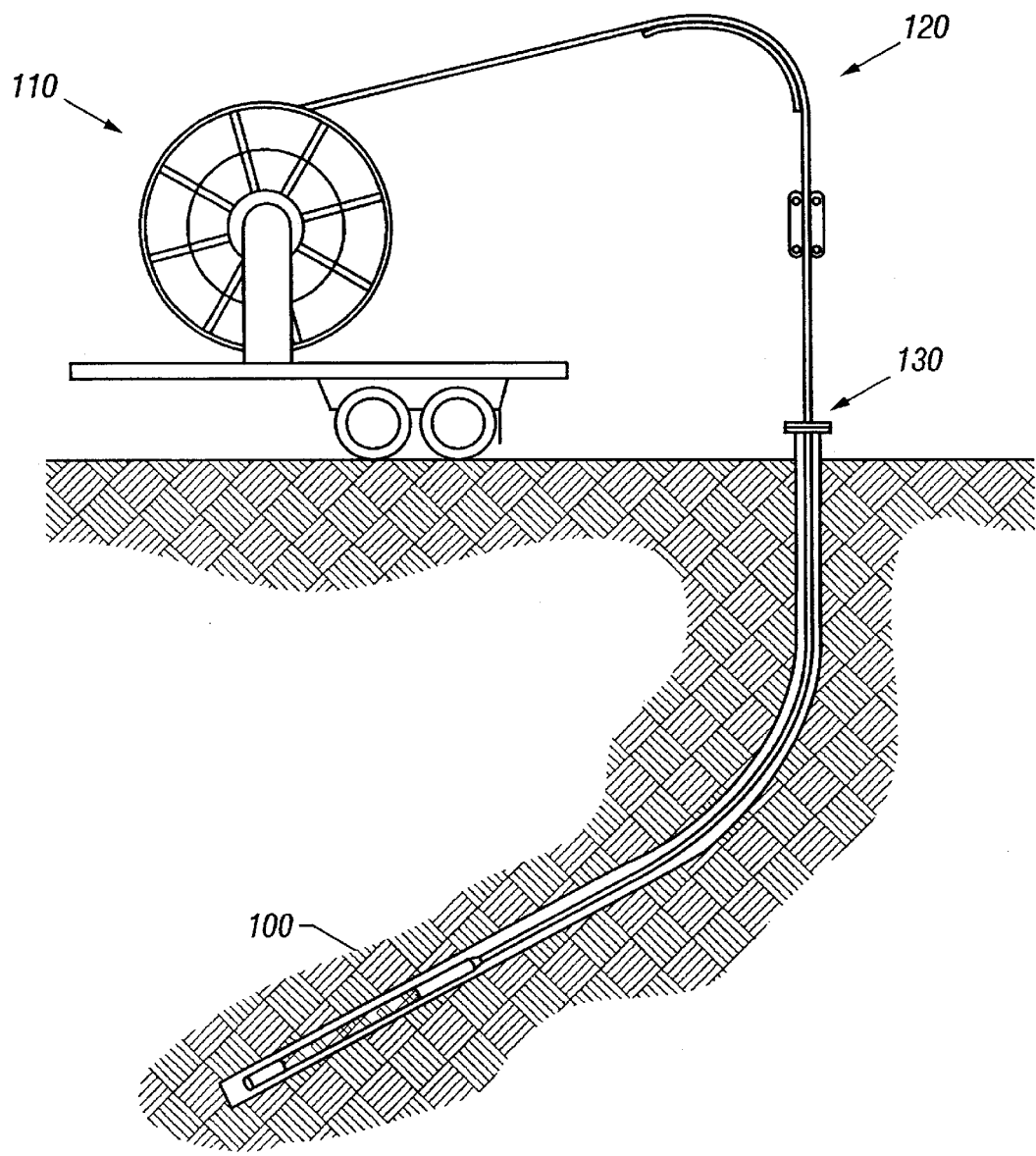
FIG. 1 is a perspective view illustrating a logging tool in a typical open-hole application.

Referring to FIG. 1, a perspective view of an embodiment of the present invention is shown. A mobile coiled-tubing apparatus 110 is shown positioned over a borehole 130. The coiled-tubing apparatus 110 lowers a length of tubing 120, an internal wireline cable (not shown) and an induction logging tool 100 in accordance with the invention. Coiled-tubing apparatus 110 includes a drum and winch mechanism to alter the length of tubing to provide movement of the induction logging tool 100 through the borehole. 130. The borehole 130 is shown as a deviated borehole, although one of skill in the art appreciates that coiled-tubing apparatus 110 may operate at numerous angles including horizontal and vertical boreholes as well.

Induction logging tool 100 includes a coil array and associated electronic signal-processing circuits discussed below. In an embodiment, the casing of induction logging tool 100 is of a metal or composite material that enables the induction logging tool components to operate at high temperatures and pressures. For example, in one embodiment, the casing enables the logging tool 100 to operate at temperatures of up to 200 degrees Centigrade and hydrostatic pressures of up to 1300 Bar. Within the metal casing, the electronic signal-processing circuits are enclosed, while the coil array is contained within a non-conductive epoxy-glass enclosure filled with hydraulic oil. The pressure of the enclosure is maintained with a piston compensator located at a lower end of the induction logging tool 100.

Induction logging tool 100 further includes sensors and may include down-hole data memory circuits and data-transmission circuits for sending the measurements acquired in real-time to the surface for further processing. In one embodiment, a wire-line (not shown) may be used with a side-entry sub to supply power and transmit digitized data to and from induction logging tool 100.

Figure 2A:
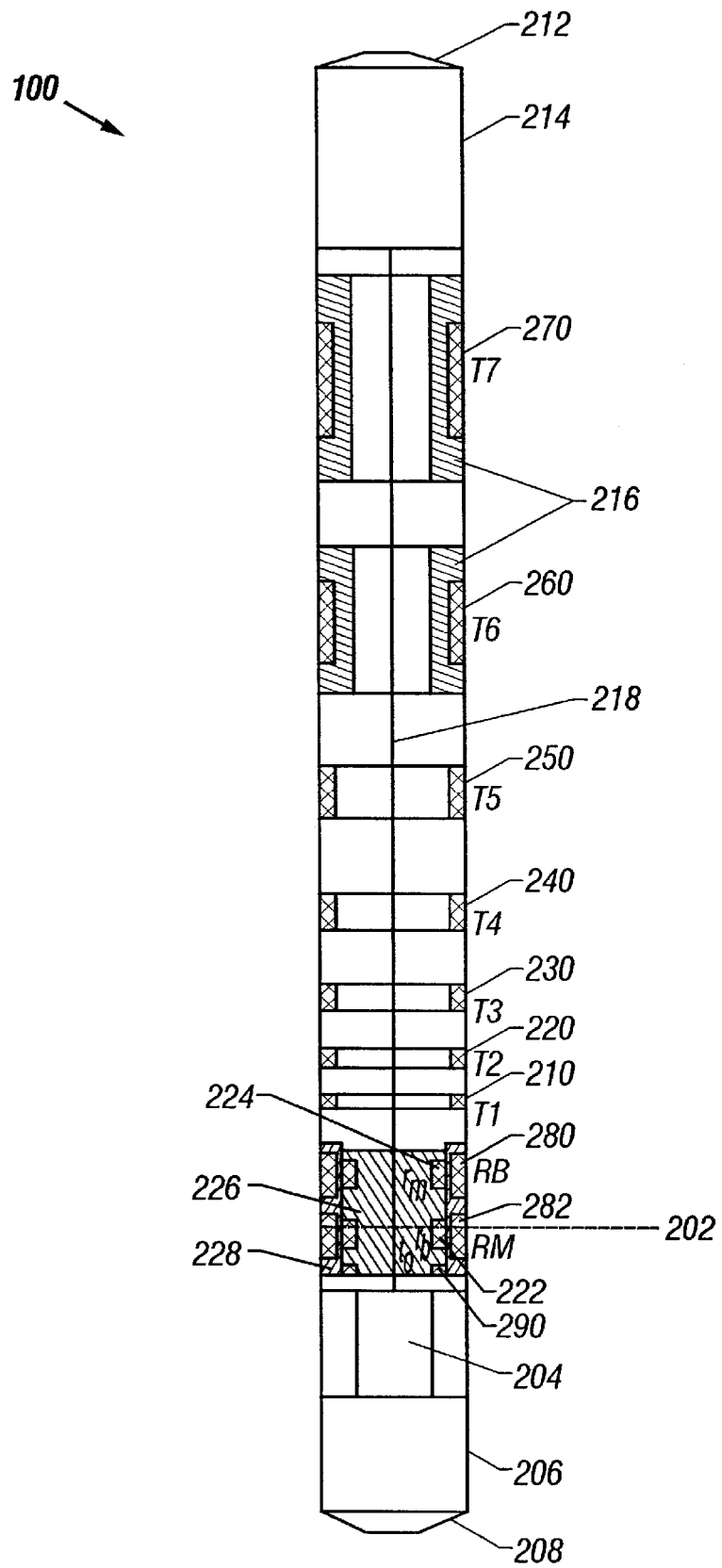
FIG. 2A is a perspective view illustrating an arrangement of coils and components of a coil sensor array in accordance with an embodiment of the present invention.

Referring now to FIG. 2A, a schematic diagram of induction logging tool 100 is shown in accordance with an embodiment of the present invention. Induction logging tool 100 includes a top 212 and a bottom 208, and a plurality of transmitter coils 210, 220, 230, 240, 250, 260, and 270 all of which are spaced above a set of receiving coils 280 and 282, together shown as receiver coil array 228.

One or more circuits 214 are disposed in an upper portion of the induction logging tool 100 for energizing the plurality of transmitter coils 210, 220, 230, 240, 250, 260, and 270. In an embodiment, the circuits 214 are coupled to the transmitter coils through cables, as is known in the art. Circuits 214 are positioned above the coil array and generate each transmitter energizing current. Receiver circuits 204 are positioned below the receiver coil array 228 and amplify, filter, and process induced receiver coil voltages.

Two of the plurality of transmitter coils, 270 and 260 are shown with magnetic core material 216 positioned inside of transmitter coils 270 and 260. In one embodiment, the magnetic core material is a magnetically permeable material to enhance the magnetic moment of the coils and compensate the loss of sensitivity due to their low operating frequency. Although two transmitter coils are shown as including magnetic core material, those of ordinary skill in the art with the benefit of this disclosure will appreciate that the need for magnetic core material is related to the distance between the measure point and the transmitter coil. Accordingly, further transmitter coils further from the measure point 202 would also preferably be designed to include magnetic core material.

Each transmitter coil of the plurality of transmitter coils is coaxial with receiver coil array 228. Each transmitter coil is further spaced at increasing distances from the receiver coil array 228 to investigate rock formation conductivity at a different radial depth. More particularly, each transmitter coil is spaced from a measure point located at an end of the induction logging tool 100 that is a function of each frequency chosen for each transmitter coil. The measure point is located within the receiver coil array 228, also located at the end of the induction logging tool 100. In an exemplary embodiment, the measure point is located near the center point of the receiver coil array 228. In one embodiment, the function is a square root function, such that the distances chosen are functions of the square root of the frequency of the transmitter. In another embodiment, the function is an inverse function such that the distances chosen are inversely related to the frequencies of the transmitter coils. In one embodiment, each transmitter coil is spaced at sequential distances related by a multiplier approximately equal to the square root of two, each transmitter coil further being energized at frequencies in an inversely related sequence of powers of two.

Figure 2B:
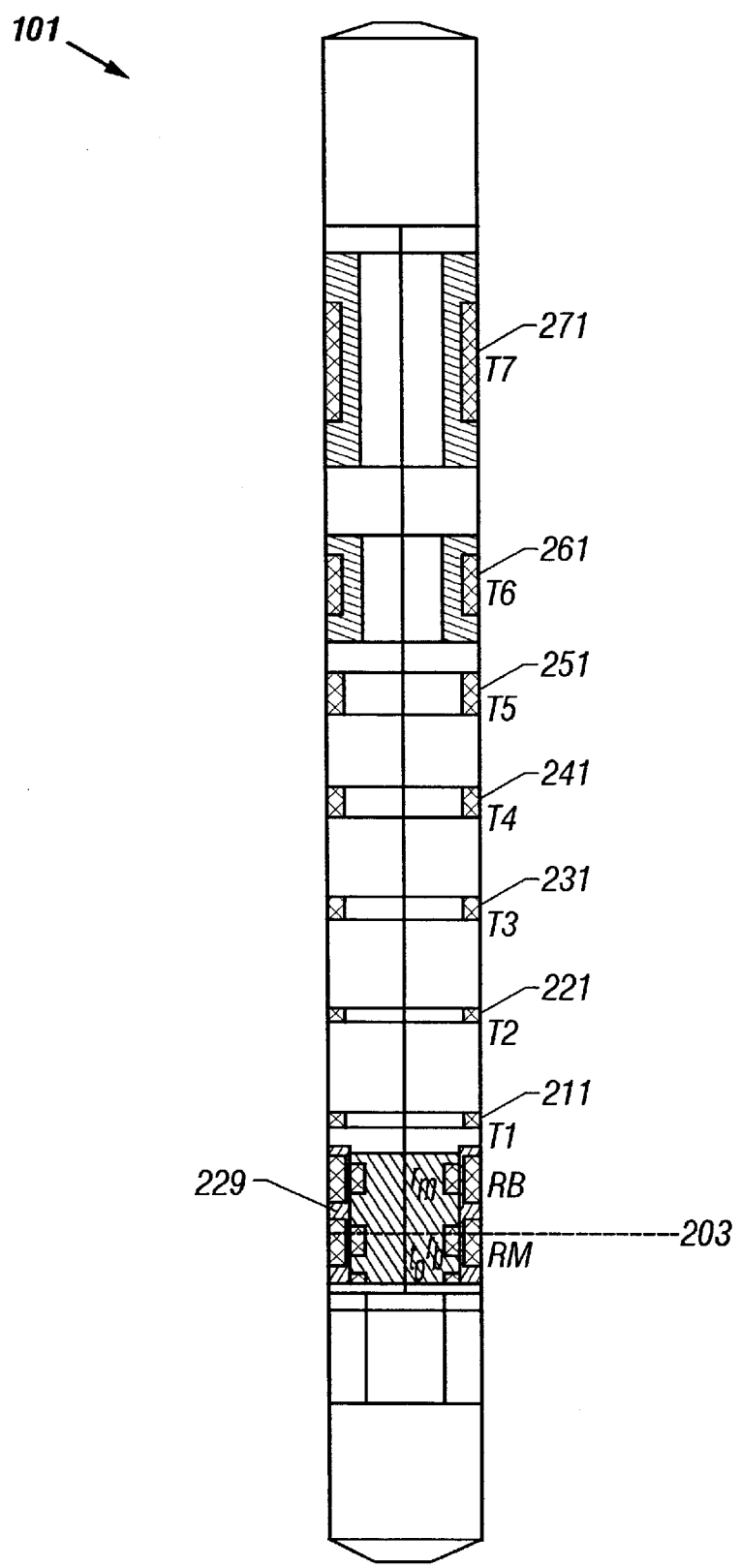
FIG. 2B is another perspective view illustrating an arrangement of coils and components of a coil sensor array in accordance with another embodiment of the present invention.

Referring now to FIG. 2B, another embodiment of the induction logging tool is shown. Unlike induction logging tool 100 shown in FIG. 2A, FIG. 2B shows induction logging tool 101 with a plurality of transmitter coil spacings for which the function relating the transmitter coil spacing to the frequency of the transmitter coil is an inverse relationship. As shown, induction logging tool O1 includes seven transmitter coils, 211, 221, 231, 241, 251, 261 and 271 disposed above receiver coil array 229. According to the embodiment, the transmitter coils are in an approximate inverse relationship with respect to the frequencies assigned to the plurality of transmitter coils. As shown, the transmitter coils are disposed above the measure point 203 in the following spacings: 0.25*N, 0.50*N, 0.75*N, 1.0*N, 1.25*N, 1.5*N and 2.0*N wherein N is a variable representing a fixed distance such as one meter distance. The embodiment shown assumes that N is one meter, however, one of skill in the art appreciates that other fractions and multiples of a meter are within the scope of the invention. For example, other parameters such as the signal processing used after receiving measurement data may dictate different meter distances for N. Further, the number of transmitter coils used can be variable, depending on the accuracy and depth of investigation required by the earth formations being explored. According to an embodiment, at least three transmitter coils are required, each co-located to a measure point within a receiver coil, each transmitter coil having substantially the same axial spatial resolution. An exemplary set of a reduced number of transmitter coil spacings and frequencies from a measure point are provided in Table 1, below.

TABLE 1

| Transmitter coil designation | Spacing (T-R) | Frequency (kHz) |
|---|---|---|
| Long | 2.000 meters (78.74") | 2 |
| Mid-Long | 1.5 meters (59.06") | 3.6 |
| Medium | 1.000 meter (39.37") | 8 |
| Mid-short | 0.5 meter (19.69") | 32 |

As shown, the long, mid-long, medium and mid-short spacings of the transmitter coils are substantially inversely proportional to the square root of the frequencies associated with the transmitter coils. Each of the spacings is relative to the measure point within the receiver coil array 228. Therefore, there is one measure point co-located for each of the transmitter coils described in Table 1. Advantageously, the co-locating of the measure point with the plurality of transmitter coils obviates the need for depth-shifting. Because there is one co-located receiver coil array for each transmitter coil disposed above the receiver coil array in each of FIGS. 2A and 2B, the effective measurement point along the axis of the tool is the same for each measurements and no depths-shifting is required. It is a particular advantage that the measurement point is also close to the bottom end of each array induction tool 100 and 101, unlike any other tools known in the art, so that it is not necessary to drill a deeper borehole to accurately measure an oil reservoir. Depth-shifting is a common problem with induction logging tools in that measurements taken with respect to multiple receivers that are not co-located with transmitter coils require a different effective measurement point along the axis of the tool for each measurement taken.

Another embodiment includes determining distances for each transmitter by determining a square root function of the frequency for a transmitter and setting a distance from a measure point that corresponds to the inverse of the square root determination. In one embodiment the square root finction is a square root of two function.

Referring to Table 2, below, an exemplary set of transmitter coil spacings and frequencies that includes a square root function is provided.

TABLE 2

| Transmitter coil designation | Spacing (T-R) | Frequency (kHz) | Depth of Investigation |
|---|---|---|---|
| T7 | 2.000 meters (78.74") | 2 | 5.66 meters (223") |
| T6 | 1.414 meters (55.67") | 4 | 4.01 meters (158") |
| T5 | 1.000 meter (39.37") | 8 | 2.83 meters (111") |
| T4 | 0.707 meter (27.83") | 16 | 1.91 meters (75") |
| T3 | 0.500 meter (19.69") | 32 | 1.30 meters (51") |
| T2 | 0.354 meter (13.92") | 64 | 0.86 meters (34") |
| T1 | 0.250 meter (9.845") | 128 | 0.58 meters (23") |

Referring to Table 2, the plurality of transmitter coils shown in FIG. 2A as transmitter coils 210, 220, 230, 240, 250, 260 and 270 are shown along with the frequency associated with each transmitter coil and the depth of investigation associated with each transmitter coil. The depth of investigation, for purposes of Table 2, is the diameter of formation that contributes 50% of the total response signal. Table 2 assumes a homogeneous rock of low conductivity.

As shown in FIG. 2A, receiver coil array 228 is shown including a main receiver 282 and a bucking receiver 280, both of which are positioned at a lower end of the induction logging tool 100. In use, the induction logging tool 100 is inserted at the lowest end of the borehole. Induction tools, such as induction logging tool 100 are generally placed at the bottom end of a "tool string" or set of sensors. Placing the receiver coil array 228 at the lower end of the induction logging tool 100 therefore allows logging the full length of the borehole without requiring extra hole to be drilled.

Another characteristic of induction array tools 100 and 101 and the arrangement of transmitter coils therein is that they are arranged to produce data with reduced anomalies caused by "skin effect". The phenomenon of "skin-effect" in conductive media causes the amplitude and phase of an electromagnetic field established in a rock medium surrounding induction array tools to be altered by the properties and boundaries between differing regions of the rock in complex ways. The transmitter coils in FIGS. 2A and 2B are designed to create an electromagnetic field that is sensed by the respective receiver coil array 228 and 229.

As appreciated by those of skill in the art appreciate, the amplitude and phase of sinusoidal signals induced in the receiver coils 228 and 229 relative to the amplitude and phase of the current flowing in an associated transmitter coil create the data for determining the characteristics of the earth formations under investigation. Thus, the measured amplitude and phase of the voltages in the receiver coil array are measures of the components of the electromagnetic field received by the receiver arrays after passing through the rock medium between the transmitter and receiver. The embodiments of the present invention relate to a system for sensing the subtle local disturbances in rock conductivity at various axial and radial distances from the tool, depending on which transmitter-receiver spacing is employed.

It is known that the physical phenomenon of "skin-effect" which has the effect of reducing the penetration of the field into the rock, is proportional to the ratio of the distance into the rock divided by the "skin-depth" (defined as the inverse of the square-root of the product of the electrical conductivity, the magnetic permeability of a medium, and the frequency). Accordingly, induction array tools 100 and 101 are sensitive to any variations in these properties as well as the presence of the rock-bed boundaries. Further, the longer transmitter-receiver coil spacing shown in FIGS. 2A and 2B are more affected by variations because the associated electromagnetic fields penetrate deeper into the rock.

In general, there are many unknown factors in the rock to be resolved by a limited number of the measurements that are possible with most induction array tools. This problem can be simplified by the choice of measurement frequency that minimizes the skin-effect in high rock conductivity. Doll addressed this situation in U.S. Pat. No. 2,582,314 by teaching that the receiver signal can be considered as a convolution of the elemental rock conductivity's located in each region surrounding the tool with the relative magnitude of the tool sensitivity in that region. Said convolution is known in the art as the "Geometrical Factor Response". Doll also taught methods of de-convolution to remove undesired portions of the spatial response in U.S. Pat. No. 3,166,709. Unfortunately, Doll did not realize the seriousness of the problem of skin-effect which can introduce errors in early tools as large as 50% in the most conductive rocks (e.g. 5 mho/meter), but the problem was later analyzed by Gianzero ("A new look at Skin-effect" SPWLA 1980). Further, Barber, U.S. Pat. No. 4,513,376 and Strickland and Sinclair, U.S. Pat. No. 5,146,167 derived methods for correcting the skin-effect influence on the spatial response to the tools, but they employed the phase-quadrature component of the received signal (the "X" signal) that is very sensitive to undesired magnetic permeability factors in the tool environment.

According to an embodiment of the invention, skin effect influence is corrected by means of simple mathematical boosting functions. As is known, if a lower transmitter frequency is employed, the skin-effect is reduced in proportion to the square-root of the frequency. The useful signal measured in a receiver is reduced in proportion to the square of frequency for a constant transmitter current, but noise signals are frequency-independent. According to the embodiment, the transmitter coil array and receiver coil array designs shown in FIGS. 2A and 2B mitigate skin effect by allowing operations at significantly lower frequency ranges than known in the prior art. Further, the data collected by an induction array tools 100 and 101 permit corrections to the data that can be accurately made using simplified mathematical functions. More particularly, as discussed above, the frequency of the transmitter coils disposed above receiver coil array 228 are scaled substantially inversely according to the square of the effective spacing to the measure point 202. This spacing advantageously sets the amount of residual skin-effect as substantially the same for each different transmitter in homogenous and near homogenous formations. Accordingly, simple and accurate methods of combining the data from the different transmitters refine the spatial response of the induction array tools. Further features of an embodiment that minimize skin effect include the use of magnetic materials described with respect to magnetic core material 216 and high coil turns-count with respect to each transmitter and receiver coil. Another very important feature of the reduction in skin-effect is that the spatial response of induction array tools 100 and 101 remains approximately constant. Since the data will be analyzed based on a known depth-of-investigation for each transmitter, and an estimate of the depth of invasion of borehole fluids into the rock determined, this feature adds greatly to the confidence placed on these estimates. The same data are often interpreted to find the oil saturation of a reservoir where an independent measure of rock porosity is not available, and these calculations translate into estimates of oil reserves of immense economic value. Clearly, the induction tool provides data that demands a high-degree of confidence in the predictability of the spatial response and in the data accuracy.

Additionally, it has been discovered that formation conductivity seldom varies greatly in the radial direction of induction array tools, usually less than one order of magnitude. Accordingly, a reasonable approximation of skin-effect affecting the induction array tools 100 and 101 assumes that the skin-effect is identical for each transmitter-receiver combination. Table 3, below, shows an estimate of the fractional skin-effect error in the top end range of homogenous rock formation conductivity for four transmitter coil spacings:

TABLE 3

| Transmitter coil designation | Spacing (T-R) | Frequency (KHz) | Skin-effect (In 1–5 mho/m.) |
|---|---|---|---|
| Long | 2 meters (78.74") | 2 | 14–32% |
| Mid-long | 1.5 meters (59.06") | 3.6 | 14–32% |
| Medium | 1 meter (39.37") | 8 | 14–32% |
| Mid-short | ½meter (19.69") | 32 | 14–32% |

The embodiments shown in FIG. 2A and FIG. 2B include a borehole compensation coil array. Referring to FIG. 2A, the embodiment shown includes borehole compensation coil array 226 disposed on an interior diameter of the induction logging tool 100, interior to the diameter of receiver coil array 228. Borehole compensation coil array 226 operates to investigate the borehole contribution to any measurements taken by the plurality of transmitter coils 210, 220, 230, 240, 250, 260 and 270 in conjunction with receiver coil array 228. More specifically, borehole compensation coil array 226 includes coils with a smaller diameter, and includes a transmitter coil ($t_o$) 290, a first compensation receiver coil ($r_m$) 224, and a second compensation receiver coil acting as a bucking coil ($r_b$) 222, each of which are placed in special relative positions to the receiver coils 282 and 280, as will be described.

Referring to Table 4, below, a borehole compensation coil shown in FIG. 2B included in an embodiment as follows:

TABLE 4

| Transmitter coil designation | Spacing (T-R) | Frequency (kHz) | Skin-effect (In 1–5 mho/m.) |
|---|---|---|---|
| Short | ¼meter (9.84") | 4 | 3.5–8% |

An alternative borehole compensation coil shown in FIG. 2A is included in an embodiment with the following properties:

TABLE 5

| Transmitter coil designation | Spacing (T-R) | Frequency (kHz) | Depth of Investigation |
|---|---|---|---|
| $t_o$ | 0.200 meter (7.874") | 4 | 0.46 meters (18") |

Both the transmitter coils shown in Tables 4 and 5 are short-spaced coil arrays designed to respond almost entirely to the borehole region around the tool. Both are operated at a low frequency (4 kHz) to avoid cross-talk from the transmitter into the main receiver coil array 228. The transmitter-receiver pair in each of induction array tools 100 and 101 has no significant skin effect even in salt-saturated brine mud at high temperature with conductivity approaching 45 mhos/meter. The spatial response is designed to have a mirror-image character compared to portions of the long-spaced transmitter response close to the axis of the tool in the vicinity of the receiver coil array 228. Subsequent signal processing involving subtraction of all or part of the short-spacing signal from the long-spacing signal, and associated filtering functions applied to data recorded as the tool moves up the borehole, allows substantial elimination of the borehole errors from the long-spaced signals.

Additionally, each of the borehole compensation coil arrays 226 shown in FIGS. 2A and 2B employ transmitter coils $t_o$, each of which is placed within the receiver coil array 228, thereby avoiding lengthening of the induction array tool.

According to a further embodiment, the net borehole response in a uniform borehole diameter is removed by filtering the signal from the borehole compensation coil array 226 as a function of borehole depth to remove transient changes, and using the result as a correction signal to the other longer-spacing arrays from the transmitter coils disposed above the receiver coil array 228 shown in FIGS. 2A and 2B. Methods of filtering using depth as a variable, also known in the art as de-convolution, are also applied to each of the sets of data obtained for each different transmitter spacing for several purposes. The main purpose is to remove the influence of rock beds at a distance along the tool axis on both sides of the measure point. These methods are well known in the art and can be applied to normalize the spatial response of all the arrays to one standard shape, typically a Gaussian function, so that the "vertical" i.e. axial resolution of the tool is fixed. This process is much simplified due to the greatly reduced skin-effect of the induction array tool. Additionally, according to an embodiment, the residual non-linear errors introduced by skin-effect are corrected by means of de-convolution of the data derived from the in-phase component of received signals to predict the missing skin-effect signal, combined with the original data in simple non-linear boosting function to reconstitute the full signal.

Referring back to FIG. 2A, at least one of borehole compensation coil array 226 and receiver coil array 228 are coupled to receiver circuits for signal processing 204 disposed below receiver coil array 228 and borehole compensation coil array 226. Receiver circuits for signal processing 204 are preferably located within a small pressure housing at the lower end of the tool. One or more shielded multi-conductor cables 218 couples the receiver circuits for signal processing 204 to the top end of the tool 212. The multi-conductor cables 218 further couples the receiver circuits 204 to a plurality of electronic circuits for data storage and transmission 214, including power supply circuitry. According to an embodiment, the plurality of transmitter coils, the borehole compensation coil array, and the receiver coil array within the induction logging tool 100 are contained within a non-conductive epoxy-glass enclosure filled with hydraulic oil. Piston compensator 206 maintains the internal hydrostatic pressure slightly higher than that of the surrounding borehole fluids.

The embodiments described in FIGS. 2A and 2B solve a common problem of low signal/noise ratio in part by using the described magnetic core materials in the transmitter coils to increase the magnetic moment, the disclosed coil array configurations, and coils with many times more turns of wire than is common in the art. Unlike other known tools in the art, embodiments shown are not temperature dependent and are stable because the disclosed coil arrays are chosen to have a mutual balance that is not strongly influenced by transmitter magnetic moment. In addition, the receiver circuits are placed close to the receiver coil array 228 thereby minimizing phase-shift errors. The result is that the tool can reliably and accurately operate at frequencies at least an order of magnitude lower than common in the art.

Figure 3:
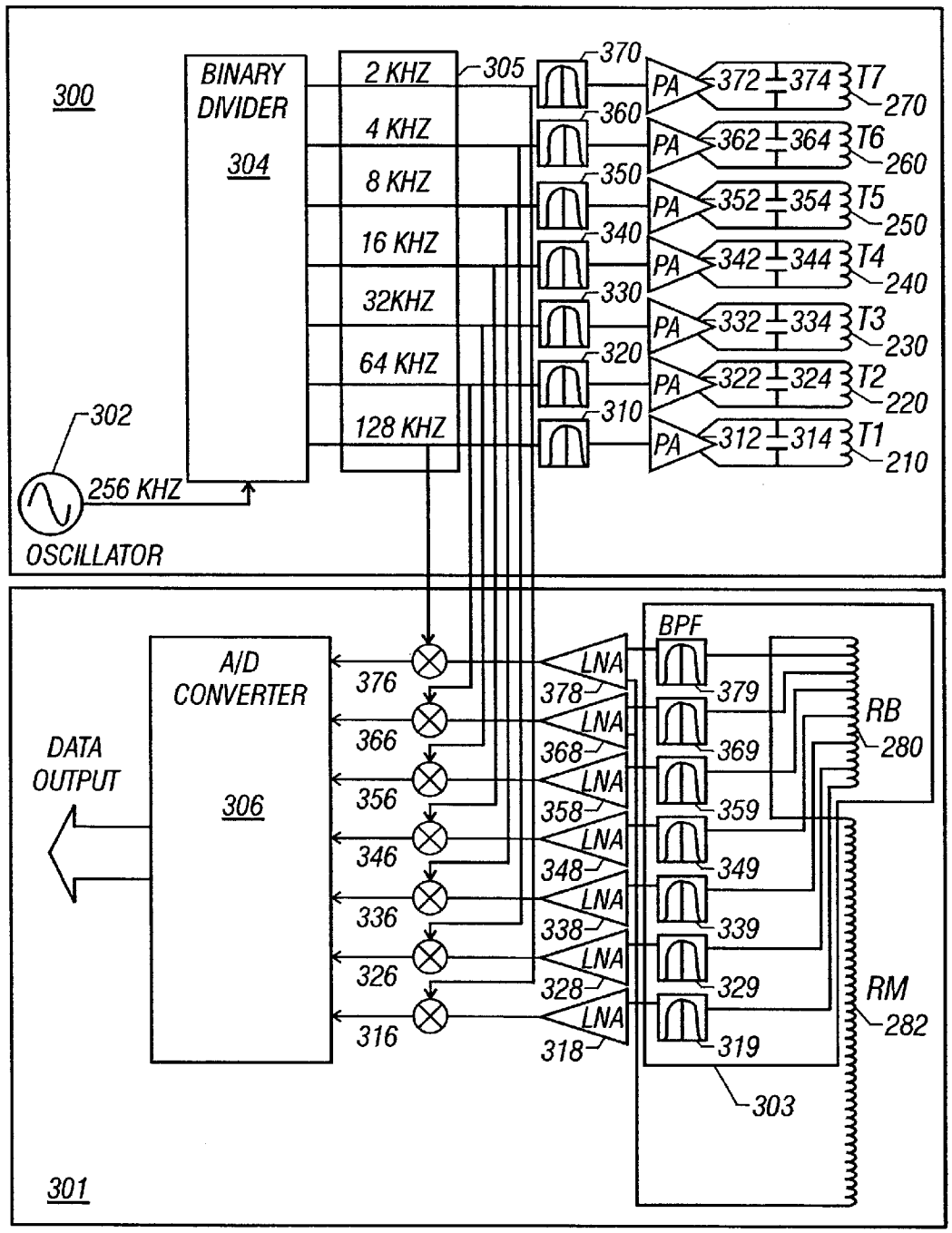
FIG. 3 is a schematic diagram illustrating transmitting and receiving circuits for energizing transmitter coils and detecting the voltages induced in receiving coils in accordance with an embodiment of the present invention.

Referring now to FIG. 3, a schematic diagram shows transmitting circuit 300 and receiving circuit 301. More specifically, transmitting circuit 300 provides energy for the plurality of transmitter coils 210, 220, 230, 240, 250, 260 and 270, and receiving circuit 301 detects the voltages induced in the receiving coils 282 and 280. A master crystal-controlled oscillator 302 provides all the energizing signal frequencies through a binary divider string 304.

According to an embodiment, binary divider string 304 provides a plurality of frequencies, such as those shown in FIG. 3. FIG. 3 shows binary divider 304 as providing seven frequencies, 2 kHz, 4 kHz, 8 kHz, 16 kHz, 32 kHz, 64 kHz and 128 kHz 305. In one embodiment, the choice of frequencies is determined as powers of two as shown in FIG. 3. However, one of ordinary skill in the art appreciates that the choice of frequency may depend on the choice of signal processing used for interpreting the induced voltages at receiving coils 280 and 282.

The plurality of frequency signals 305 are supplied to a plurality of band-pass filters 310, 320, 330, 340, 350, 360 and 370. Each of the plurality of band-pass filters filter out undesired harmonics. The filtered signals output from each filter of the plurality of band-pass filters are provided to power amplifiers 312, 322, 332, 342, 352, 362 and 372. Each of the plurality of power amplifiers amplify the received frequency signals to drive the transmitter coil attached thereto. More specifically, each transmitter coil 210, 220, 230, 240, 250, 260 and 270 is coupled in parallel with a capacitor, one of capacitor 314, 324, 334, 344, 354, 364 and 374. Thus, each transmitter coil is provided with an associated capacitor that tunes the transmitter coil to the appropriate frequency, thereby minimizing reactive power flow.

The plurality of frequency signals 305 are additionally supplied to a plurality of phase-sensitive detectors 316, 326, 336, 346, 356, 366 and 376 as reference inputs for the receiver circuit 301. According to an embodiment, receiving circuit 301 includes a mutual balancing system 303 for balancing the received signal associated with each transmitter coil of the plurality of transmitter coils. More specifically, mutual coupling to receiver coil 282 is different from each of transmitter coils 210, 220, 230, 240, 250, 260 and 270. Thus, mutual balancing system 303 includes receiving coil 280 that acts as a bucking coil, and a plurality of band-pass filters 319, 329, 339, 349, 359, 369, and 379 coupled to the receiving coil 280 at a plurality of tap locations. More specifically, receiving coil 280 is tapped at the plurality of tap locations, wherein the tap locations are at different numbers of turns to provide mutual balance for each associated transmitter coil. One of skill in the art appreciates that the location of the taps is determined by the spacing of the associated transmitter coil. Each tap on receiving coil 280 is coupled to one of a plurality of band-pass filters 319, 329, 339, 349, 359, 369, and 379. The band-pass filters, in one embodiment, are frequency-selective filter circuits having a high input impedance and high rejection factor at all frequencies other than the frequency for an associated transmitter coil.

Each band-pass filter 319, 329, 339, 349, 359, 369, and 379 is coupled to transmit a signal to one of a plurality of low-noise amplifiers, shown as low-noise amplifiers 318, 328, 338, 348, 358, 368, and 378.

Each of the plurality of low-noise amplifiers 318, 328, 338, 348, 358, 368, and 378 is coupled to one of a plurality of phase-sensitive detectors 316, 326, 336, 346, 356, 366 and 376. As discussed above, the plurality of phase-sensitive detectors is coupled to the output frequency signals from binary divider 304. The output frequency signals from binary divider 304 provide reference signals for comparison to the input signals from the plurality of low-noise amplifiers. Thus, as one skilled in the art appreciates, the phase-sensitive detectors are able to provide data concerning, inter alia, the length of time and distance pertaining to transmitted signals from the plurality of transmitter coils. According to an embodiment, phase-sensitive detectors 316, 326, 336, 346, 356, 366 and 376 are synchronized with each transmitter and are used to demodulate voltages. Each detected voltage is converted to a digital representation with a resolution equivalent to 24 binary bits in A/D converter 306. Additional electronic circuits within receiving circuit 301 periodically inject calibration signals, compute the ratio of the detected voltages to the calibration signals to correct the data for errors or drift in the circuits, and transmit this data to recording and display equipment at the surface of the earth.

The combination of the balancing system 303 and the plurality of low-noise amplifiers and phase-sensitive detectors described above enables each signal to be measured simultaneously without mutual interference. Further, if the induction array tool is operated with all the transmitters energized simultaneously it may be necessary to employ synchronous or phase-sensitive detectors in the receiver circuits to avoid cross-talk between receiver channels. Synchronous detectors are able to perfectly reject even-order harmonic frequencies.

The outputs of the phase-sensitive detectors are passed to an analog-to-digital converter 306, producing a serial stream of digital data that may be stored or transmitted to the surface of the earth for further processing.

Figure 4:
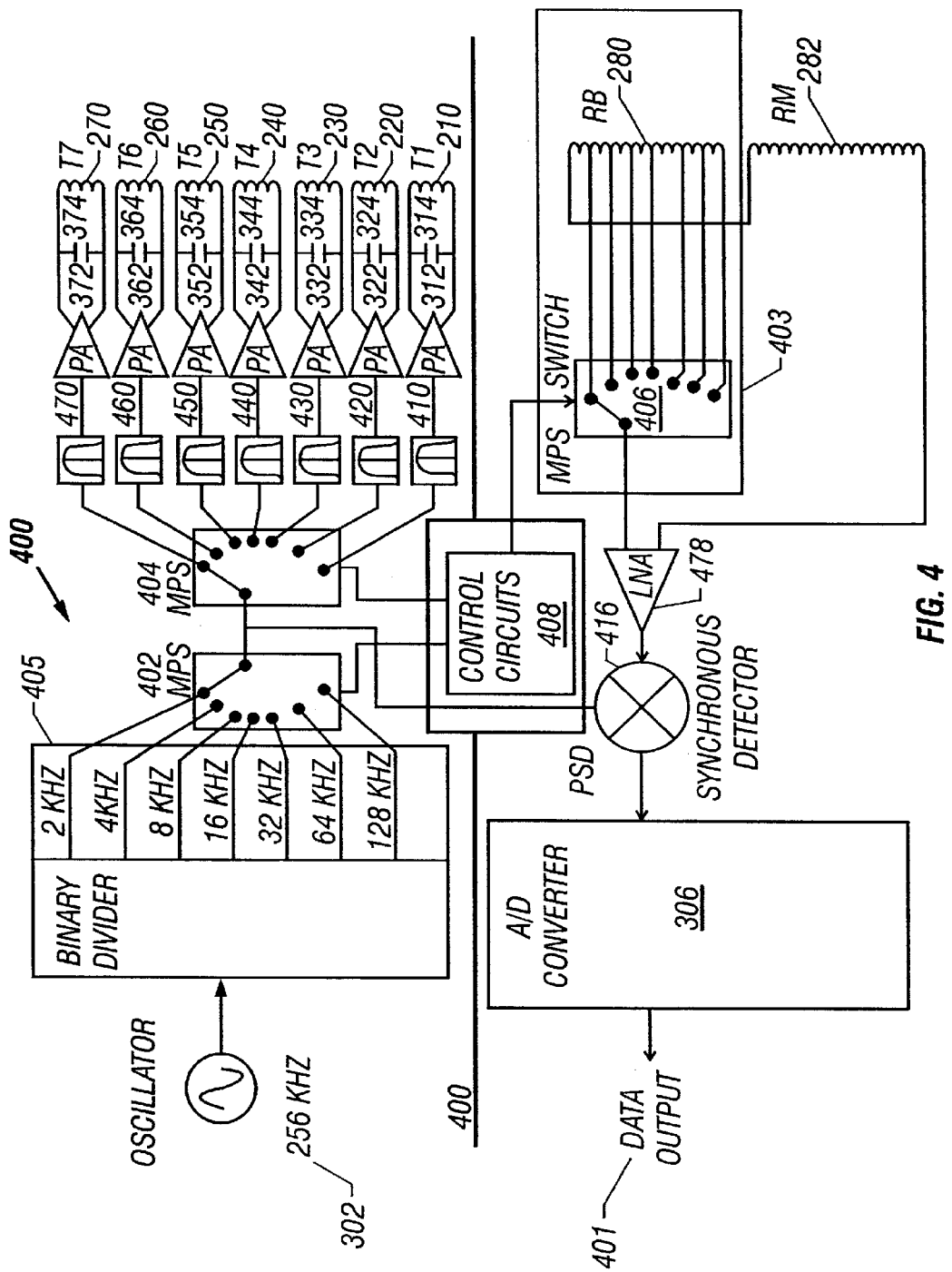
FIG. 4 is a schematic diagram illustrating an alternative embodiment of transmitting and receiving circuits for energizing transmitter coils and detecting the voltages induced in receiving coils in accordance with an embodiment of the present invention.

Referring now to FIG. 4, another embodiment of the present invention illustrates a lower-complexity, lower power consuming time-multiplexing induction logging system than that illustrated in FIG. 3. FIG. 4 illustrates transmitting circuit 400, receiving circuit 401, and control circuit 408. Unlike the embodiment of FIG. 3, FIG. 4 includes a transmitting circuit 400 that employs multi-pole switches (MPS) 402 and 404 to sequentially couple the plurality of transmitter coils to a plurality of frequency signals 405, thereby reducing the complexity of the transmitting circuitry. The MPS switches 402 and 404 couple each of the frequency signals 405 sequentially via MPS 402 and 404, to the plurality of transmitter coils 210, 220, 230, 240, 250, 260 and 270. As in FIG. 3, each transmitter coil is coupled to a capacitor, one of the plurality of capacitors 314, 324, 334, 344, 354, 364 and 374, as well as a power amplifier, one of the plurality of power amplifiers 312, 322, 332, 343, 354, 362 and 372. MPS 404 couples one of the frequency signals 405 to one of a plurality of band-pass filters 410, 420, 430, 440, 450, 460 and 470, each of which have a signal line for switching in MPS 404. The plurality of band-pass filters is coupled to transmit a selected frequency signal to one of the plurality of power amplifiers.

The signal transmitted via transmitting circuit 400 is received via receiving coils 280 and 282 in the receiving circuit 401. More specifically, receiving circuit 401 includes balancing system 403, receiving coil 282, a low-noise amplifier 478, a phase-sensitive detector 416, and an analog-to-digital converter 306.

The balancing system 403 includes receiving coil 280, functioning as a bucking coil. As in FIG. 3, receiving coil 280 is tapped at a plurality of locations according to the frequency of the transmitted signal. Balancing system 403 further includes a multi-pole switch 406 wherein one of the plurality of taps is selectively coupled to an input for low-noise amplifier 478. MPS 406 is further coupled to control circuit 408 for receiving commands identifying one of the plurality of taps. MPS 406 reduces the complexity of the receiving circuit 401 by reducing the number of components in the balancing system as compared to FIG. 3.

Low-noise amplifier 478 is coupled to receive the output from MPS 406 and the received signal from receiving coil 282. In one embodiment, low-noise amplifier 478 is a single broadband amplifier. Low-noise amplifier 478 is coupled to a phase-sensitive detector 416. Receiving circuit 401 includes a single low-noise amplifier and a single synchronous detector 416, thereby reducing the number of components. The embodiment further includes coupling phase-sensitive detector 416 to receive the frequency signal chosen by MPS 402 of the transmitting circuit. Further, control circuit 408 coordinates which of the frequency signals is chosen by the MPS 402 and 404, as well as the choice of tapped signals via MPS 406. Thus, phase-sensitive detector 416 is frequency-locked to the transmitter coil associated with each of the taps represented in MPS 406.

Control circuit 408, according to an embodiment, is a master sequencing and control system. In an exemplary embodiment, control circuit 408 is implemented as a software program in a micro-controller circuit that generates the control signals for MPS 402, 404 and 406.

One of skill in the art with the benefit of this disclosure appreciates that the embodiment shown in FIG. 4 reduces the complexity of the transmitting and receiving circuits 400 and 401. Further, the embodiment reduces the power consumed by the transmitter coils 210, 220, 230, 240 250, 260 and 270 and associated circuits. Although the sequential nature of the embodiment necessitates a longer time to acquire all of the data at each position in borehole 130, the embodiment of FIG. 4 is merely exemplary and can be altered to accommodate alternative logging speeds. For example, features of both exemplary embodiments shown in FIGS. 3 and 4 can be combined. For example, additional MPS circuitry, such as additional MPS 402 and 404 combinations along with an additional MPS 406, in an alternative embodiment, can be provided for additional frequency signal logging. Each set of MPS circuitry would be coupled to control circuit 408. Depending on the speed desired for logging, the number of MPS circuits could be adjusted. For each additional MPS circuit combination, additional low-noise amplifiers 478 and phase-sensitive detectors 416 would be added, as will appreciated by one of skill in the art.

Figure 5:
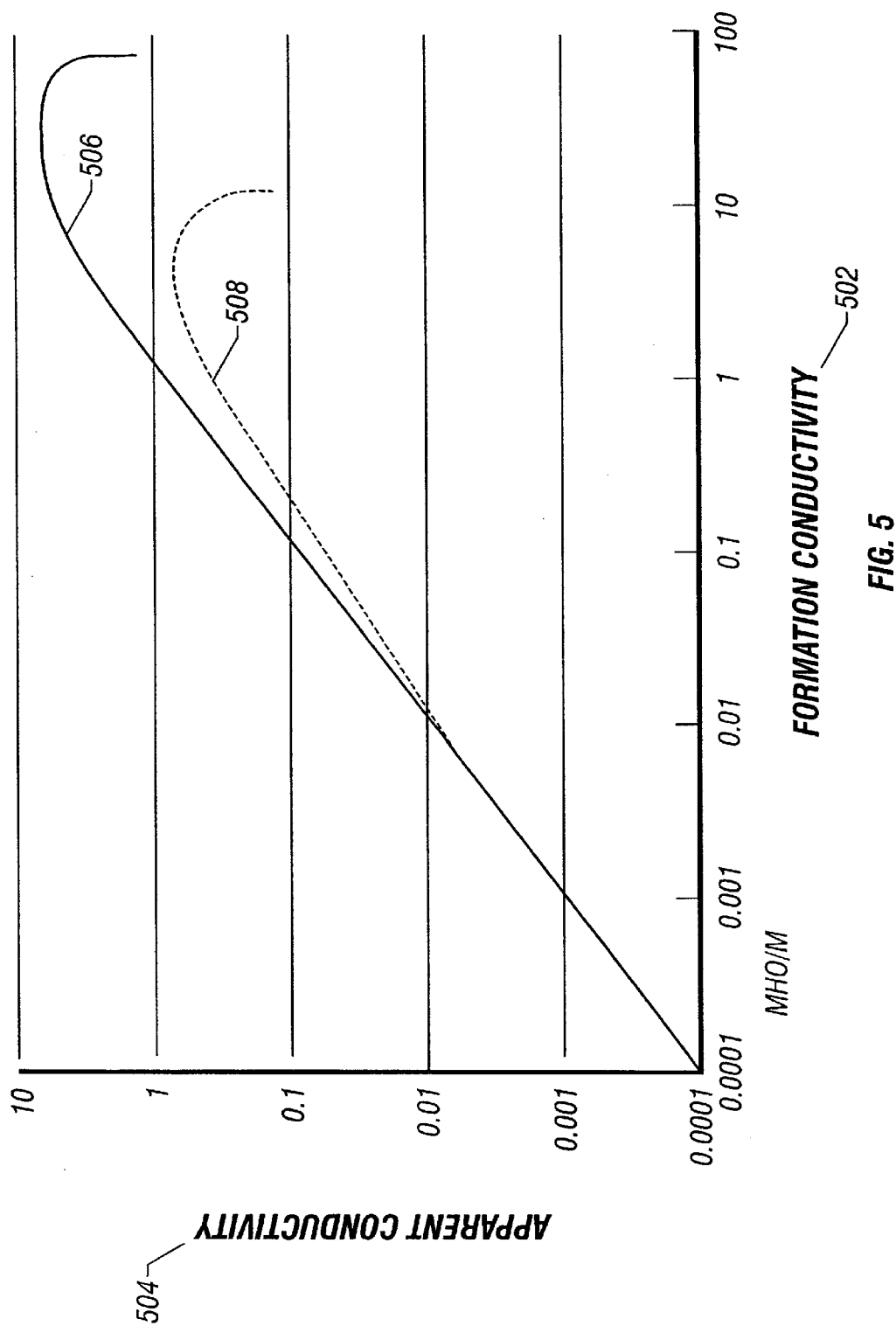
FIG. 5 is a graph generated by a computer model that illustrates the problems associated with operating the long-spaced transmitter coils at too high a frequency.

Referring now to FIG. 5 is a graphical representation of an embodiment of the invention as compared to a prior art induction logging tool. The prior art induction logging tool representation illustrates problems associated with induction logging tools operated with long-spaced transmitter coils at high frequencies. More particularly, FIG. 5 illustrates homogeneous formation conductivity (in mho/meter) along the horizontal axis 502. The vertical axis illustrates the received signal scaled appropriately to be equal to actual conductivity in ideal conditions (apparent conductivity).

Referring to the dashed-line curve 508, a 2-meter spacing and a frequency of 20 KHz is illustrated. As shown, the dashed-line curve 508 increases up to a maximum and then begins to decline. As shown, the declination of curve 508 results in two values of formation conductivity for each apparent conductivity. Thus, the range at which a double reading is possible results in uncertainty in the interpretation of the data. The double reading occurs because the skin-depth in the formation shrinks to a value lower than the transmitter-receiver coil spacing and the received signal becomes increasingly attenuated. Prior art induction logging tools with similar high frequencies resolve the problem of double-valued data by employing the quadrature-signal component (X-signal) which increases in value with conductivity at high conductivity levels. However, X-signal methods suffer from the problem of unwanted mutual-unbalance signals caused by formation or borehole magnetic material near the sensor coils thereby introducing errors.

Referring back to FIG. 5, data curve 506 illustrates the conductivity associated with an induction logging tool according to embodiments of the present invention. Specifically, curve 506 illustrates a tool employing a frequency of 2 kHz. As shown, curve 506 has minimal attenuation at the highest formation conductivity found in nature of approximately 10 mho/meter.

Figure 6:
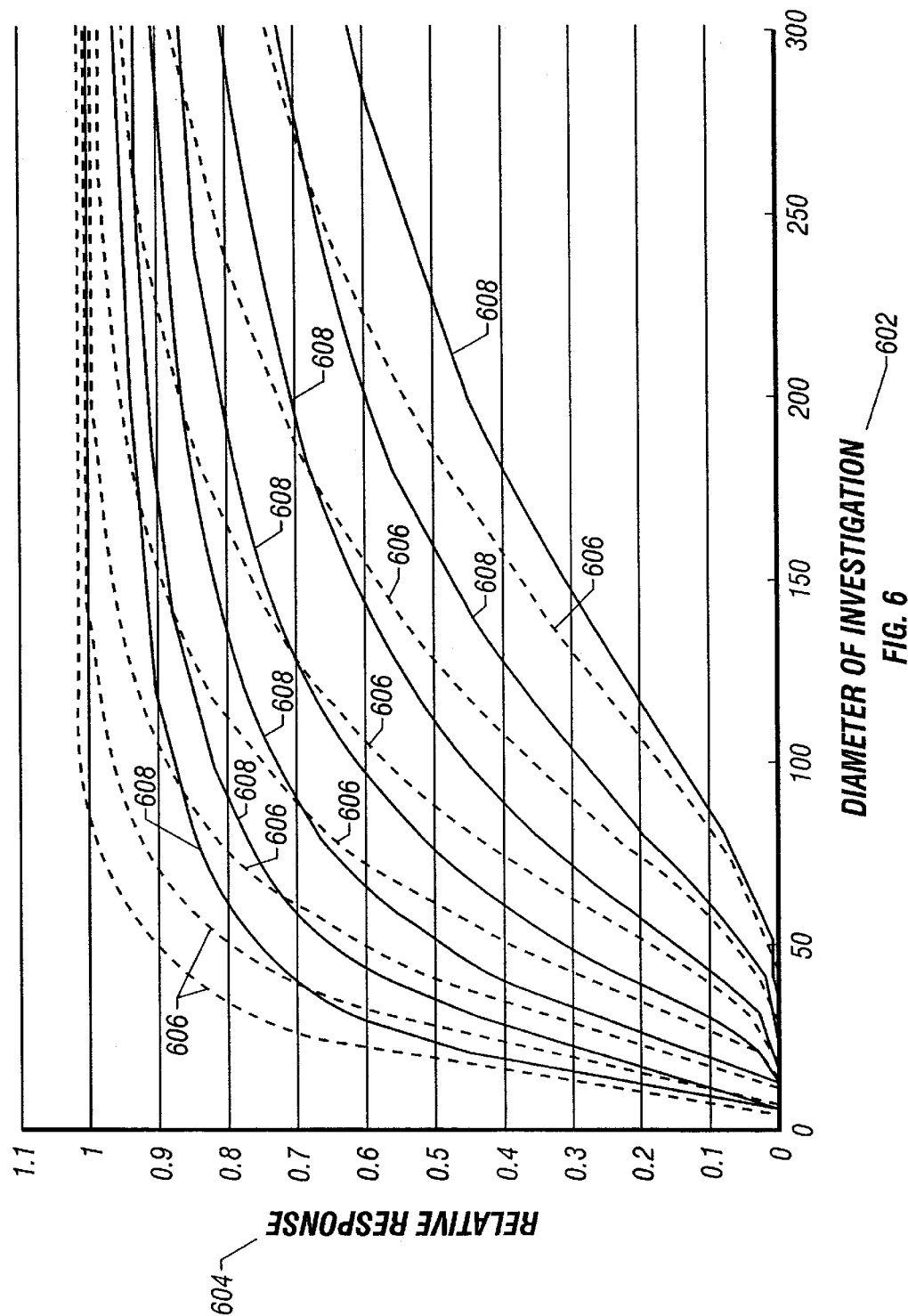
FIG. 6 is a graph illustrating how the matched depths of radial investigation displayed by all transmitter-receiver coil sets varies as the formation conductivity and skin-effect increase in accordance with an embodiment of the present invention.

Referring now to FIG. 6, a graph illustrates matched depths of radial investigation displayed by all transmitter-receiver coil sets vary as the formation conductivity and skin-effect increase. The curves simulate the effect of a region of contrasting conductivity of increasing radial diameter on the tool response. The horizontal axis 602 represents the diameter in inches of the zone of investigation. The vertical axis 604 is scaled as a dimensionless value of relative response to each radial region of a formation. The combination of characteristic response curves 608 assists in interpreting fluid-invasion effects in cases for which borehole fluid and formation connate fluid conductivity are different but of similar order of magnitude. The minimal effect on the spatial response is shown by the small shift of the dashed-line curves 606 (1 mho/meter formation conductivity), compared to the solid-line curves 608 (0.001 mho/meter) which have negligible skin effect.

Figure 7:
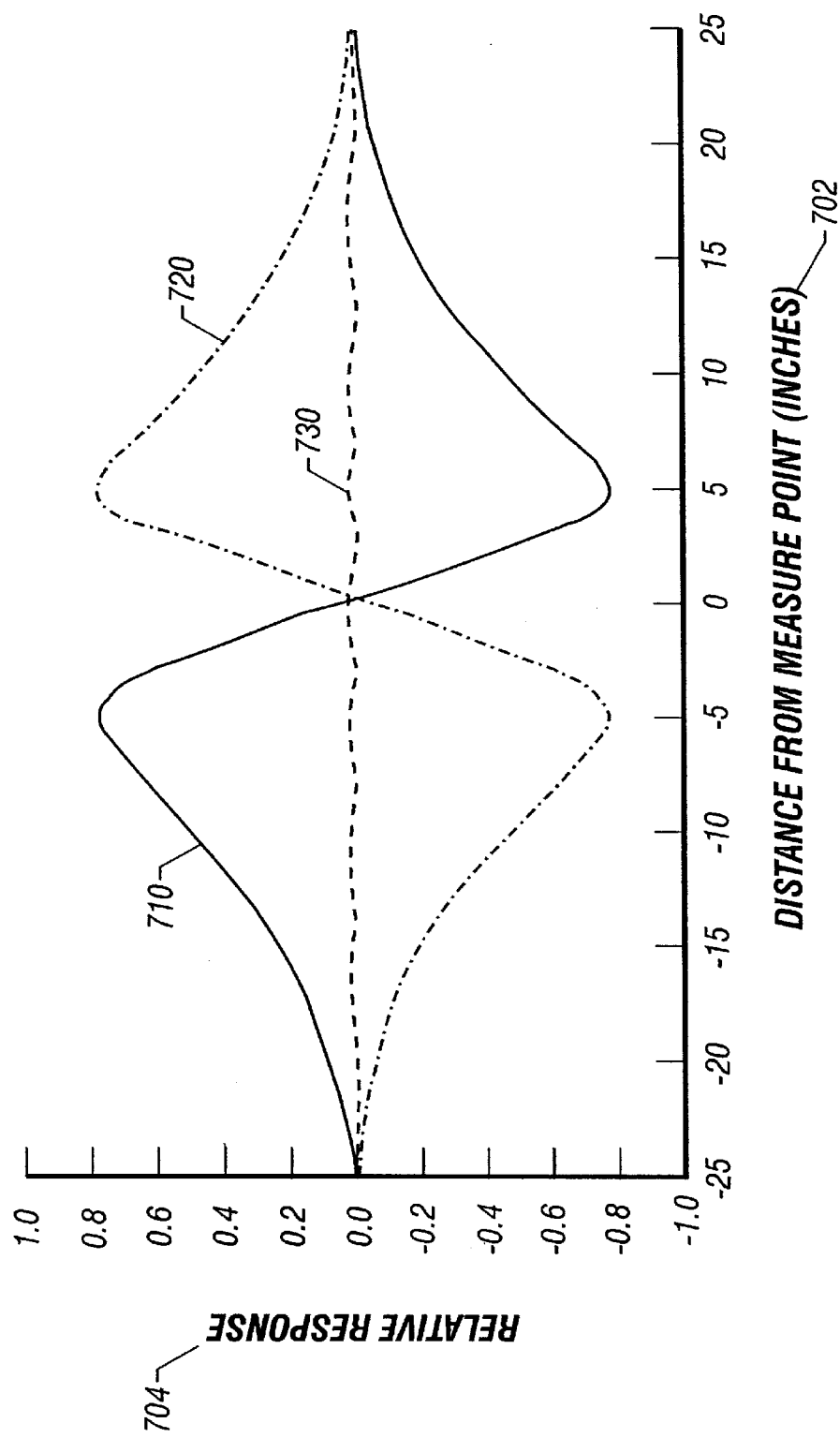
FIG. 7 is a graph illustrating the response of the set of coil arrays to a cave, or an enlarged portion of borehole in accordance with an embodiment of the present invention.

Referring now to FIG. 7, a graph illustrates the response of a two meter spaced transmitter array to a cave or an enlarged portion of borehole 130. The horizontal axis 702 represents the distance from the cave to the measure-point of each array. The vertical axis 704 represents relative response in arbitrary units that depend on the conductivity of fluid in the cave. Line 710 illustrates a typical response from one of the plurality of transmitter coils 210, 220, 230, 240, 250, 260 and 270 shown in FIG. 2A. Line 720 illustrates the response of borehole compensation coil array 226. Line 730 represents the combined response of lines 710 and 720. A computer model is used to calculate the apparent conductivity profile due to the presence of a 16-inch diameter×8 inches long cave in an 8-inch diameter borehole, filled with a fluid of contrasting conductivity.

Referring to FIG. 7 in combination with FIG. 2A, the responses shown in the graph of transmitting coils 210, 220, 230, 240, 250, 260 and 270 have quite similar perturbations due to a cave, while the cave-effect correction from borehole compensation coil array 226, including transmitter coil 290, has a mirror-image response. With the benefit of this disclosure, one skilled in the art can readily see how the borehole compensation coil array 226 response may be conveniently spatially filtered using a software filter appropriate for each transmitter coil 210, 220, 230, 240, 250, 260, and 270, and combined with the transmitter coil 210, 220, 230, 240, 250, 260 and 270 responses to provide almost perfect removal of the undesired perturbation caused by the cave. Additionally, it will be apparent that the nature of these software filters may be adjusted for various nominal borehole diameters, to provide a more exact removal of the cave errors. At each location of a coil, there is a peak in the magnitude of the spatial response close to the tool axis. The receiver coil array 228 includes coils that are connected with both positive 282 and negative 280 polarity to achieve a mutual balance. By aligning the positive peaks of the borehole compensation coil array 226 along the axis of the tool with the negative peaks of the long-spaced array (and vice-versa), a total cancellation of the peaks is achieved when the signals from each array are subtracted. In this manner, the influence of transient changes in borehole diameter may also be removed as is shown in FIG. 7.

Figure 8:
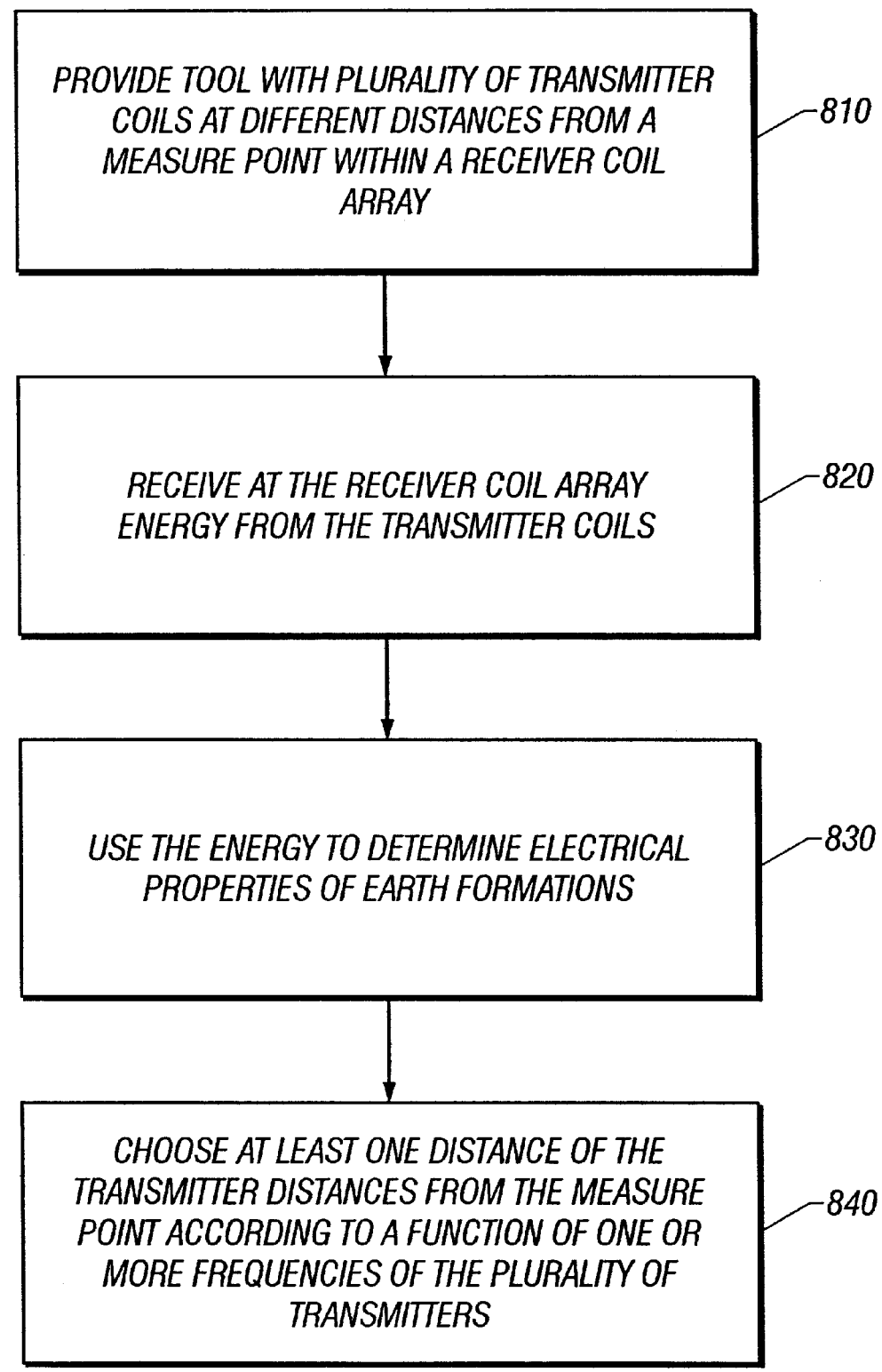
FIG. 8 is a block diagram illustrating a method in accordance with an embodiment of the present invention.

Referring now to FIG. 8, a flow diagram illustrates a method 800 for determining transmitter coil spacings in accordance with an embodiment. More particularly, block 810 provides for providing a tool operable in a borehole, the tool including a plurality of transmitter coils that are at a plurality of distances from a measure point located within at least one receiver coil array at an end of the tool. For example, referring to FIG. 2A, transmitter coils 210, 220, 230, 240, 250, 260 and 270 are spaced at a plurality of distances from measure point 202.

Block 820 provides for receiving, at the at least one receiver coil array, energy from the plurality of transmitter coils. Block 830 provides for using the energy from the plurality of transmitter coils to determine the electrical properties of earth formations.

Block 840 provides for choosing at least one distance of the plurality of distances from the measure point according to a function of one or more frequencies associated with one or more transmitters of the plurality of transmitters. For example, according to an embodiment, the distances from the measure point are determined as inversely proportional to the square root of the frequency associated with each transmitter coil. According to another embodiment, the distances include $\sqrt{2}*N$, $\sqrt{2}/2*N$, $\sqrt{2}/4*N$, 2N, N, N/2 and N/4, wherein N is a fixed distance such as a meter. The function, according to an embodiment, is a square root function of the frequency for each transmitter, and the plurality of distances from a measure point that corresponds to the inverse of the square root determination.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for induction logging of electrical properties of earth formations, the method comprising:

providing a tool operable in a borehole, the tool including a plurality of transmitter coils that are at a plurality of distances from a measure point located within a receiver coil array at an end of the tool;

receiving at the receiver coil array, induced voltages resulting from currents induced in the earth formations by one or more transmitters of the plurality of transmitter coils;

using the energy from the plurality of transmitter coils to determine the electrical properties of earth formations; and choosing one or more of the plurality of distances from the measure point according to a function of one or more frequencies associated with one or more transmitters of the plurality of transmitters.

2. The method of claim 1 wherein the function includes determining the distance that is inversely proportional to a square root of the frequency associated with the one or more transmitters.

3. The method of claim 1 wherein the distances include $\sqrt{2}*N$, $\sqrt{2}/2*N$, $\sqrt{2}/4*N$, 2N, N, N/2 and N/4, wherein N is a fixed distance.

4. The method of claim 1 wherein the measure point is located closer to the receiver coil array than to any one of the plurality of transmitter coils.

5. The method of claim 1 further comprising:
operating the tool as the tool moves through the borehole.

6. The method of claim 1 further comprising:
subtracting signals received from a borehole compensation array disposed at the end of the tool from signals received at the receiver coil array, the subtracting reducing the influence of local changes in borehole diameter.

7. The method of claim 1 further comprising:
spatially filtering the signals received at a borehole compensation array, the spatial filtering matching signals to a spatial response of the plurality of transmitter coils.

8. The method of claim 6 wherein the borehole compensation array includes:
a main borehole compensation receiver coil;
a borehole compensation bucking receiver coil coupled to the main borehole compensation receiver coil; and
a borehole compensation transmitter coil configured to be operable with the main borehole compensation receiver coil and the borehole compensation bucking receiver coil.

9. The method of claim 1 further comprising:
receiving residual skin-effect fractional error at the receiver coil array that are substantially the same for each transmitter of the plurality of transmitters wherein the earth formations are approximately homogenous.

10. The method of claim 1 wherein the plurality of transmitter coils have the same axial spatial relationship.

11. The method of claim 1 wherein at least one transmitter of the plurality of transmitters contains a magnetic core material to enhance the magnetic moment of the at least one transmitter, the magnetic moment of the transmitter being increased independent of mutual balancing of the transmitter-receiver combination of the at least one transmitter and the receiver coil array.

12. The method of claim 11 wherein the enhancing the magnetic moment of the at least one of the transmitters of the plurality of transmitters permits operations at frequencies of 8 kHz and lower.

13. The method of claim 1 wherein the receiver coil array is coupled to one or more receiver circuits located near the receiver coil array, the location assisting in maintaining the high signal/noise ratio of the transmitter-receiver combination of the plurality of transmitters and the receiver coil array.

14. The method of claim 1 wherein the tool includes:
a transmitting circuit energizing the plurality of transmitter coils via a master crystal-controlled oscillator coupled to a binary divider string to provide a plurality of frequency signals; and
a receiving circuit coupled to the transmitting circuit.

15. The method of claim 14 wherein the transmitting circuit includes:

a plurality of band-pass filters coupled to receive the plurality of frequency signals; and a plurality of power amplifiers coupled to the plurality of transmitter coils, the plurality of transmitter coils further being coupled to a plurality of capacitors, each transmitter coil having an associated capacitor for tuning the transmitter coil.

16. The method of claim 14 wherein the transmitting circuit further provides reference inputs to a plurality of phase-sensitive detectors providing synchronous detection of the receiver signals.

17. The method of claim 14 wherein the receiving circuit includes a mutual balancing system for balancing received signals associated with each transmitter coil of the plurality of transmitter coils.

18. The method of claim 17 wherein the mutual balancing system includes a receiving coil, a bucking coil, and one or more band-pass filters coupled to the receiving coil at one or more tap locations, the tapping at different turns counts of the receiver coil to provide mutual balancing for associated transmitter coils.

19. The method of claim 18 wherein the receiving circuit includes one or more phase-sensitive detectors synchronized with one or more transmitters to demodulate voltages received by the receiver coil, the balancing system and the phase-sensitive detectors enabling simultaneous measurements of the earth formations independent of mutual interference.

20. The method of claim 14 wherein the tool further includes a control circuit coupled to the transmitter circuit and the receiver circuit, the transmitter circuit further including one more multi-pole switches configured to sequentially couple the plurality of transmitter coils to a plurality of frequency signals, the one or more multi-pole switches coupling the plurality of frequency signals to one or more band-pass filters.

21. The method of claim 20 wherein the control circuit coordinates which of the frequency signals is chosen by the one or more multi-pole switches and chooses one or more of a plurality of tapped signals.

22. The method of claim 20 wherein the control circuit is implemented as a software program in a micro-controller circuit, the software program generating control signals for the one or more multi-pole switches.

23. An apparatus for investigating underground earth formations, the apparatus comprising:

a plurality of transmitter coils that are at a plurality of distances from a measure point located at an end of the apparatus; and a receiver coil array coupled to receive induced voltages resulting from currents induced in the earth formations by one or more transmitters of the plurality of transmitter coils, wherein the measure point is located within the receiver coil array, wherein one or more of the plurality of distances from the measure point are determined according to a function of one or more frequencies associated with one or more transmitters of the plurality of transmitters.

24. The apparatus of claim 23 wherein the function includes determining the distance that is inversely proportional to a square root of the frequency associated with the one or transmitter.

25. The apparatus of claim 23 wherein the distances include $\sqrt{2}*N$, $\sqrt{2}/2*N$, $\sqrt{2}/4*N$, 2N, N, N/2 and N/4, wherein N is a fixed distance.

26. The apparatus of claim 23 further comprising:

a borehole compensation array disposed at the end of the tool configured to collect signals to be subtracted from signals received at the receiver coil array, the subtracting reducing the influence of local changes in borehole diameter, the borehole compensation array including:

a main borehole compensation receiver coil;

a borehole compensation bucking receiver coil coupled to the main borehole compensation receiver coil; and a borehole compensation transmitter coil configured to be operable with the main borehole compensation receiver coil and the borehole compensation bucking receiver coil.

27. The apparatus of claim 23 wherein the plurality of transmitter coils have the same axial spatial relationship.

28. The apparatus of claim 23 wherein at least one transmitter of the plurality of transmitters contains a magnetic core material to enhance the magnetic moment of the at least one transmitter, the magnetic moment of the transmitter being increased independent of mutual balancing of the transmitter-receiver combination of the at least one transmitter and the receiver coil array.

29. The apparatus of claim 28 wherein the enhanced magnetic moment of the at least one transmitter of the plurality of transmitters permits operations at frequencies of 8 kHz and lower.

30. The apparatus of claim 23 wherein the receiver coil array is coupled to one or more receiver circuits located near the receiver coil array, the location assisting in maintaining the mutual balancing of the transmitter-receiver combination.

31. The apparatus of claim 23 further comprising:

a transmitting circuit energizing the plurality of transmitter coils via a master crystal-controlled oscillator coupled to a binary divider string to provide a plurality of frequency signals; and a receiving circuit coupled to the transmitting circuit.

32. The apparatus of claim 31 wherein the transmitting circuit includes:

a plurality of band-pass filters coupled to receive the plurality of frequency signals; and a plurality of power amplifiers coupled to the plurality of transmitter coils, the plurality of transmitter coils further being coupled to a plurality of capacitors, each transmitter coil having an associated capacitor for tuning the transmitter coil.

33. The apparatus of claim 31 wherein the transmitting circuit further provides reference inputs to a plurality of phase-sensitive detectors providing synchronous detection of for signals of the receiving circuit.

34. The apparatus of claim 31 wherein the receiving circuit includes a mutual balancing system for balancing received signals associated with each transmitter coil of the plurality of transmitter coils.

35. The apparatus of claim 34 wherein the mutual balancing system includes a receiving coil, a bucking coil, and one or more band-pass filters coupled to the receiving coil at one or more tap locations, the tapping at different turns counts of the receiver coil to provide mutual balancing for associated transmitter coils.

36. The apparatus of claim 35 wherein the receiving circuit includes one or more phase-sensitive detectors synchronized with one or more transmitters to demodulate voltages received by the receiver coil, the balancing system and the phase-sensitive detectors enabling simultaneous measurements of the earth formations independent of mutual interference.

37. The apparatus of claim 31 wherein the apparatus further includes a control circuit coupled to the transmitting circuit and the receiving circuit, the transmitting circuit further including one more multi-pole switches configured to sequentially couple the plurality of transmitter coils to a plurality of frequency signals, the one or more multi-pole switches coupling the plurality of frequency signals to one or more band-pass filters.

38. The apparatus of claim 37 wherein the control circuit coordinates which of the frequency signals is chosen by the one or more multi-pole switches and chooses one or more of a plurality of tapped signals.

39. The apparatus of claim 37 wherein the control circuit is implemented as a software program in a micro-controller circuit, the software program generating control signals for the one or more multi-pole switches.

* * * * *